INVENTOR
C. P. VILLARS
BY R. B. Andi
ATTORNEY

Nov. 20, 1962 C. P. VILLARS 3,065,422

NONLINEAR PCM ENCODERS

Filed Nov. 18, 1959

3 Sheets-Sheet 2

INVENTOR
C. P. VILLARS
BY R. B. Anderson
ATTORNEY

Nov. 20, 1962 C. P. VILLARS 3,065,422

NONLINEAR PCM ENCODERS

Filed Nov. 18, 1959 3 Sheets-Sheet 3

INVENTOR
C. P. VILLARS
BY R. B. Ardis
ATTORNEY

United States Patent Office 3,065,422

Patented Nov. 20, 1962

3,065,422

NONLINEAR PCM ENCODERS

Claude P. Villars, Gillette, N.J., assignor to Bell Telephone Laboratories, Incorporated, New York, N.Y., a corporation of New York Filed Nov. 18, 1959, Ser. No. 853,921
7 Claims. (Cl. 325—141)

This invention relates to transmission by pulse code modulation (PCM) and, more particularly, to nonlinear PCM encoders that combine the processes of volume range compression and encoding.

Prior to the transmission of a message signal by PCM, it is first quantized. In the quantizing process, the exact value of the signal at any instant of time is approximated by one of a number of discrete values called quantum levels. Unfortunately, the difference between the exact value of the signal and the quantum level which is encoded to represent it, results in distortion. This distortion is referred to commonly as quantizing noise.

Consider an encoder having a linear encoding characteristic, i.e., an encoder in which the message-to-code relationship is linear. One can appreciate that quantizing noise in such an encoder is especially objectionable and very often intolerable when the instantaneous value of the message signal is small, since the ratio between the signal and the quantizing noise can be undesirably low for such values. Quantizing noise ordinarily causes no concern, however, when the instantaneous value of the message signal is large, for the ratio between the signal and the quantizing noise is then ordinarily high. Consequently, a figure of merit in systems employing quantization is the signal-to-quantizing-noise ratio; the larger this ratio, the better.

In order to ameliorate the undesirable relationship between low-valued message samples and the attendant quantizing noise, it is advantageous to distribute the quantum levels so that the average signal-to-quantizing-noise ratio will be kept at a maximum. This distribution, which incidentally results in a nonlinear encoding characteristic, is usually such that more quantum levels are allocated to the low-valued samples of the message signal. The low-valued samples are accordingly more accurately defined as they are translated into a representative code. Since the dynamic range of the message signal is thus effectively compressed, the low-valued samples are emphasized, i.e., effectively increased in amplitude, while the high-valued samples are de-emphasized. In any case, an ideal allocation of the available quantum levels or, in other words, an ideal encoding characteristic, will depend upon the statistical amplitude distribution of the message signal.

It is therefore the principal object of the invention to produce message-to-code relationships (encoding characteristics) yielding optimum signal-to-quantizing-noise performance for signals of specified statistical amplitude distribution.

B. D. Smith describes a basic feedback coder in his paper entitled, "Coding by Feedback Methods," which appears in volume 41 of the Proceedings of the I.R.E., August 1953, at page 1053. He compares the merits and shortcomings of the feedback method (the method employed in conjunction with the present invention) with those of other coding methods. He also discloses a method of nonlinear encoding in which a single reference network is used to produce a hyperbolic encoding characteristic. He concludes at page 1058 with the prediction that other reference networks producing mathematically-defined characteristics "other than sections of hyperbolas should be possible but have not been found."

The present invention is directed to at least a partial fulfillment of Smith's prediction. The invention reveals a general method for realizing encoding characteristics of prescript mathematical definition. The method is exemplified by application to three illustrative families. As have B. D. Smith (who discloses the hyperbolic encoding characteristic discussed above), L. A. Meacham, Patent No. 2,592,308, issued April 8, 1952 (who discloses a logarithmic encoding characteristic), and my United States Patent 3,016,528, issued January 9, 1962 (which discloses a piecewise-linear encoding characteristic), to name only a few, the present invention adds to the storehouse from which future PCM systems will draw.

In accordance with the invention, that part of the encoder which generates reference signals for comparison with the message input, comprises a reference-generating system of two or more resistance networks connected in cascade. Each of the networks consists of a plurality of branches that are logically switched in and out of the reference signal path in accordance with the outcome of the next previous message-reference comparison. Corresponding branches of the networks are switched periodically in unison. The output voltage of the individual networks is made to vary as a prescribed function of the output code. As it progresses from network to network toward the point of comparison with the message signal, the reference signal thus changes its relationship with the code. As the reference signal exits each reference network, this relationship is either linear, parabolic, hyperbolic, or a hybrid combination of these relationships. When the reference signal finally reaches the message-reference comparison point, the desired encoding characteristic will have been achieved. The choice and number of the individual reference networks will define this characteristic.

Illustrative embodiments for deriving three encoding characteristics of prescript mathematical definition will be described. For example, in one of these embodiments (that of FIG. 1, a feedback encoder whose encoding characteristic consists of sections of a third-order parabola), the output voltage of the first network of a cascaded chain of three reference networks varies directly with the output code. This output voltage is then fed to a second reference network whose output voltage varies as the square of the code. Ultimately, the output of the third network, which varies as the cube of the code, is compared with the input message signal.

A clearer understanding of the invention will be imparted, if the discussion which follows is read with reference to the drawings, in which.

Figure 1:
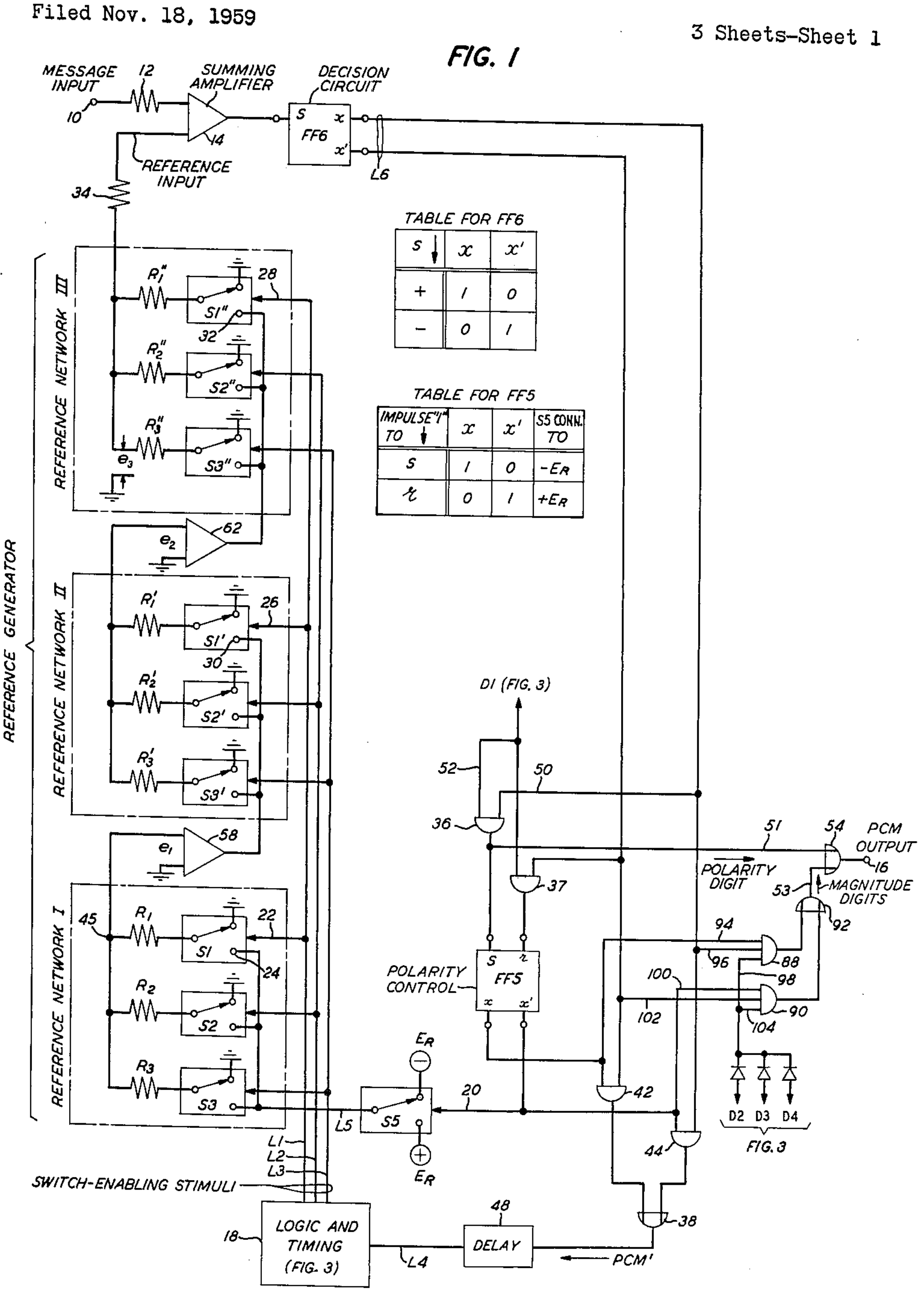
FIG. 1 shows an encoder embodying the invention and having a reference generator of an illustrative "Type A"
Figure 2:
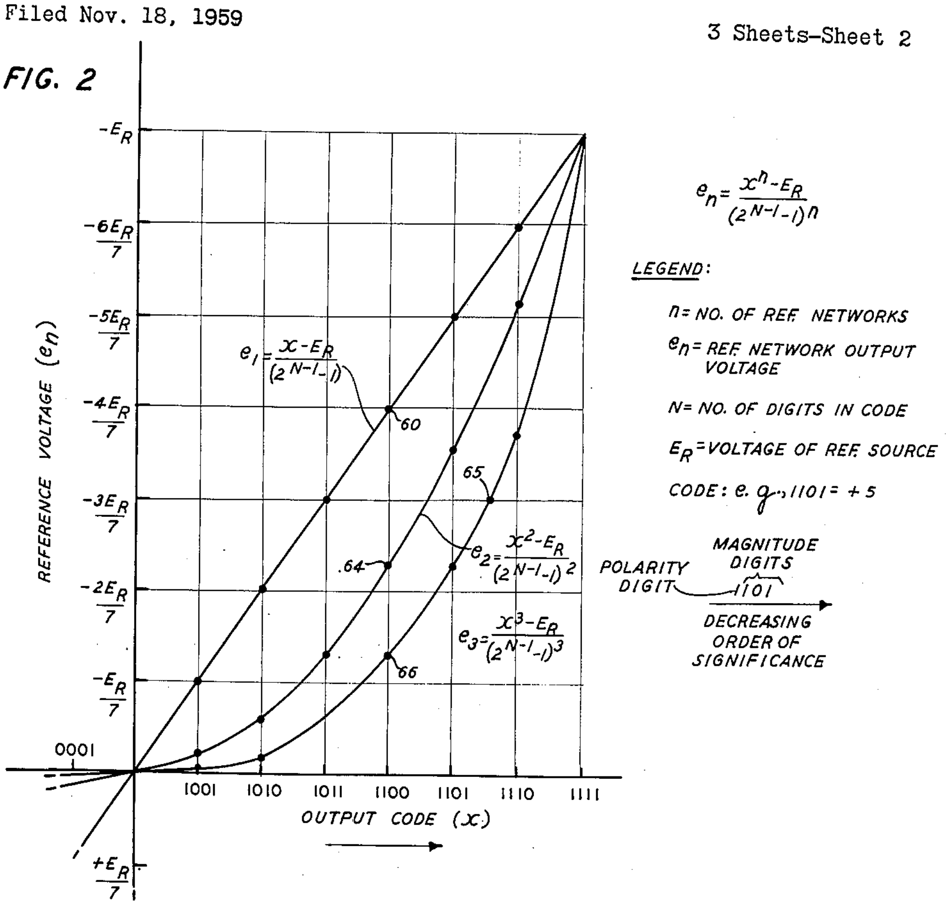
FIG. 2 is a plot of the successive reference voltages, indicated on FIG. 1, versus the output code.

FIG. 1 shows a feedback encoder of a type that we shall here call "Type A." It has a message-to-code relationship defined by a third-order parabola. This relationship is illustrated in FIG. 2. Although the plot of FIG. 2 is of reference voltage versus code it serves to illustrate the message-to-code relationship as well. The reason FIG. 2 serves this dual function is bottomed on the fact that the encoding of each message sample requires, as we shall see, that the magnitudes of the sample and the last reference signal with which the sample is compared be equated as nearly as possible. Because of this equality, then, the relationship which the message sample amplitude bears to its code representation will be substantially identical to the relationship between the magnitude of the ultimate reference signal with which the sample is compared and the code.

In FIG. 1, a message sample is fed into a message input terminal 10 and thence through a summing resistor 12 into a summing amplifier 14. A binary code representation of the analog value of the sample will be generated at the output terminal 16. The relationship between the value of the sample and its code counterpart is nonlinear. See, for example, the curve for $e_3$ in FIG. 2. The relationship is different in each of the illustrative encoders of FIGS. 1, 4, and 5.

In the process of translating the analog sample to digital code, reference signals are generated by a reference generator consisting of a cascaded chain of reference networks I, II, and III. These reference signals are generated sequentially in response to the outcome of comparisons between the message sample and previously generated reference signals. The reference signals and the message sample are of opposite polarity, as we shall see. The comparisons are accomplished by the summing amplifier 14.

Since the message sample and each reference signal with which the sample is compared, are of opposite polarity, and the aim of the comparison process is to equate, as nearly as possible, the absolute magnitudes of the sample of the last reference signal of the sequence, summation of the sample and the last reference signal ideally results in a null condition at the output of amplifier 14. But in view of the limited number of reference levels ordinarily available, it is not often that the message sample and the last-generated reference level will entirely cancel each other at the input of amplifier 14. The small amount of residual error is responsible for the quantizing noise spoken of above.

In the illustrative embodiment of FIG. 1, a four-digit code has been employed for ease of narration and to avoid undue complication. In the practice of the invention, the code may consist of any number of digits, the number being limited only by practical considerations. Ordinarily, more digits are needed and additional circuitry for increasing the number of digits may be readily incorporated. For example, if a five-digit code were desired, each of the reference networks I, II and III would include another branch. To these additional branches, another switch-enabling lead would be connected to supply additional stimuli from the logic and timing circuit 18. The logic circuitry of circuit 18 would also be changed.

In the four-digit code employed by FIG. 1, the first, or most significant digit, is a polarity digit which indicates the polarity of the message sample (see the legend of FIG. 2). The remaining three digits are used to represent the magnitude of the message sample. In the time slot allocated for each of these remaining three digits, a reference signal is generated for comparison with the message sample at the summing amplifier. Each message sample is represented by a code group consisting of the four digits spoken of above. Since the code employed in the illustrative embodiments presented here is a binary code, each digit may be either a "1" or a "0." "1" and "0" are binary terms indicating the presence or absence of a stimulus, respectively. In keeping with this convention, throughout the application a "stimulus" or "impulse" should be understood to mean a potential level corresponding to the binary state "1." Thus, when it is said that a "stimulus" or "impulse" has been supplied to a particular terminal, it is known that the terminal has been placed in the binary "1" state.

At the inception of the encoding process, no reference signal is generated by the reference generator since the first time slot is reserved for a polarity determination. Consequently, only the message sample is fed into the summing amplifier 14. The output of the summing amplifier is supplied to the decision circuit FF6 which may be a Schmitt trigger circuit having unity loop gain. ("The Schmitt Multivibrator," by G. L. Swaffield, published in Wireless World, page 344, July 1958, is a thoroughgoing article on the Schmitt circuit.) A Schmitt circuit produces a flat-topped output pulse (in binary terminology, a "1") which persists so long as the input waveform exceeds a specified voltage.

The ensuing discussion will be facilitated if, instead of referring to the output terminal $x$ of a particular flip-flop, say FF6, as "the output terminal $x$ of flip-flop circuit FF6," the terminal is referred to simply as "terminal $x$(FF6)."

Figure 3:
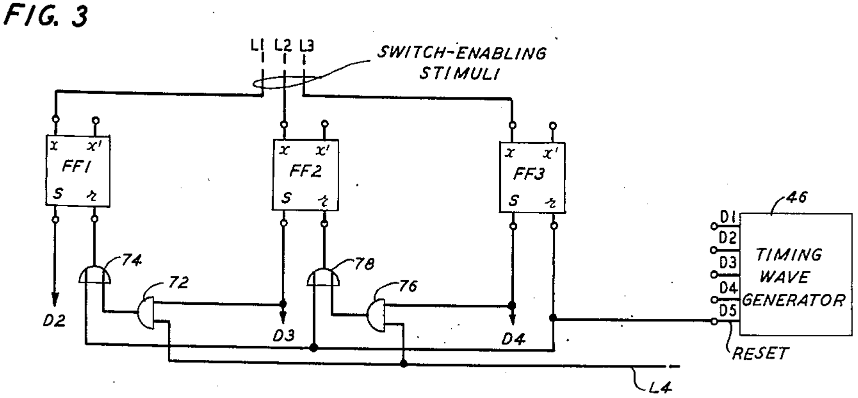
FIG. 3 is a block diagram which exemplifies logic and timing circuitry that may be used in FIG. 1.

It will be assumed that the terminals $x$ and $x'$ of various flip-flop circuits—the decision circuit FF6 of FIG. 1, as well as the switch-enabling circuits FF1, FF2, and FF3 of FIG. 3—are in a certain state at the beginning of each code group. In all instances, the states of associated $x$ and $x'$ terminals are binary complements. Thus, for example, if an $x$ terminal is in the "1" state, its associated $x'$ terminal is in the "0" state.

We will assume that at the commencement of each code group or while the encoder is at rest, the $x$ terminals are in the "0" state and, consequently, the terminals $x'$ are in the "1" state. This assumption does not apply to the polarity control circuit FF5, since its state will be determined during the first time slot of each frame (a frame, it will be recalled, encompasses each code group).

It will be seen that when any AND or OR gate input terminal, or any flip-flop input terminal, or any switch-enabling conductor is connected to a circuit point in the "1" state, the terminal or conductor will be in a condition to enable, change the state, or switch its associated device. Thus, for example, when terminal $x'$(FF5) is in the "1" state, polarity switch S5 will switch conductor L5 from negative $E_R$ to positive $E_R$.

In each of the flip-flop circuits, the terminals $s$ and $r$ represent input terminals to which stimuli are supplied. The terminals $x$ and $x'$ represent the output terminals from which stimuli are derived. Each of the $s$ terminals may be thought of as a "set" terminal. In response to a "1" stimulus (but as to FF6, in response to a positive potential only), the $s$ terminal will cause its associated circuit to change from its rest to its other state. Each of the $r$ terminals may be thought of as a "reset" terminal, in that it returns its associated circuit to the rest state.

One can see, from a perusal of the table for FF6, that when terminal $s$(FF6) is at a positive potential, the states of terminals $x$(FF6) and $x'$(FF6) are respectively "1" and "0." Circuit FF6 is then in its abnormal state. Thus, in keeping with the characteristic property of a Schmitt circuit, so long as the voltage at $s$(FF6) exceeds a specified level, here zero volts, square pulses of opposite polarity will persist at $x$(FF6) and $x'$(FF6). Conversely, when terminal $s$(FF6) is at a negative potential (and also when its potential is zero), the states of terminals $x$ (FF6) and $x'$ (FF6) are respectively "0" and "1."

Unlike the decision circuit FF6, which is a Schmitt circuit, the polarity control circuit FF5 and the switch-enabling circuits FF1 to FF3 of FIG. 3 are of the conventional Eccles-Jordan type. It should be noted, therefore, that although all of the circuits mentioned in the next preceding sentence are shown in identical flip-flop convention, the decision circuit FF6 differs in function and structure from the others.

As to each of the latter, when either of input terminals $s$ or $r$ is impulsed, the circuit will remain in the state determined by the impulsed terminal until such time as the other terminal is impulsed. A constantly-present stimulus is therefore not required to maintain either of the two possible states of equilibrium.

Consider the polarity circuit FF5, for example. Its operation and its effect on the polarity switch S5 are shown in the table for FF5. Notice that the application of an impulse ("1") to terminal $s$(FF5) will cause terminals $x$(FF5) and $x'$(FF5) to interchange their rest states and assume the "1" and "0" states, respectively. Since the switch-enabling conductor 20 will not then be energized, the polarity switch S5 will remain in its rest position as shown. The above states of the terminals $x$(FF5) and $x'$(FF5) and the polarity switch S5 are reversed when, and only when, an impulse is supplied to the input terminal $r$(FF5). This reversal is indicated in the third row of the table for FF5.

But as to the decision circuit FF6, its state, as we have seen, is dependent upon the polarity manifest at its input terminal $s$(FF6). If this polarity changes from positive to zero or negative, or vice-versa, the state of FF6 will correspondingly change. A constantly-present potential of specified polarity is therefore required to maintain decision circuit FF6 in a particular state.

Thus far we have considered the operations and interrelationships of the decision circuit FF6, the polarity control circuit FF5 and the polarity switch S5. We will now consider the other elements of FIG. 1.

The switches S1 to S3, S1′ to S3′, and S1″ to S3″ are all shown in conventional block form. A switch-enabling lead is associated with each of them. When a stimulus is conveyed from the logic and timing circuit 18 to a switch via one of the conductors L1, L2 or L3 and the enabling lead associated with the switch, the switch will switch from its rest state to tis energized state. The switch S1 will serve to exemplify the operation of the others. All of the switches are shown in their rest state, connecting their associated resistors to ground. When a stimulus is supplied by the logic and timing circuit 18 to the conductor L1 and thence to the switch-enabling lead 22 of switch S1, switch S1 will disconnect its associated resistor R1 from ground and connect it to the reference signal terminal 24.

A stimulus, when supplied to the switch-enabling lead 22, is supplied simultaneously to the switch-enabling leads 26 and 28 of the switches S1′ and S1″, respectively. Consequently, the switches S1′ and S1″ switch their associated resistors to their respective reference signal terminals 30 and 32. It can be seen, therefore, that when the conductor L1 is energized by a stimulus from the logic and timing circuit 18, the set of resistance branches comprising the resistors $R_1$, $R_1'$ and $R_1''$ is switched into the reference signal path. This path emanates from the polarity switch S5 and proceeds successively through each of these resistors to the reference input resistor 34 of summing amplifier 14. The same process will occur in the other resistance branch sets when stimuli are supplied to the conductors L2 and L3.

In each reference network the ohmic values of the resistive branches are related as the powers of two. Thus, for example, in reference network I.

$$R_1:R_2:R_3=2^0:2^1:2^2$$

The resistive branches of the other reference networks bear the same relationship. It is not necessary, however, that corresponding resistive branches (those switched in unison, e.g., $R_1$. $R_1'$, $R_1''$) have identical ohmic values.

As in the case of the reference generator swtiches discussed in the preceding paragraph, an effort has been made to simplify the drawings wherever possible. The essential features of the invention are thus unbeclouded by unnecessary circuit details. Accordingly, the AND and OR gates are shown in an accepted convention. The AND gates are each represented by a closed arc, the output lead of the gate extending from the midpoint of the arc and the input leads being connected to the chord of the arc. See, for example, AND gate 36. The OR gates are also represented by a closed arc but are distinguished from the AND gates in that the input leads extend through the chord of the arc to the arc. See, for example, OR gate 38.

Thus in the convention used here, a gate is immediately identified as an OR gate when its input leads are shown to stem through the chord of the arc to the arc. If the input lead extends only to the chord of the arc, the gate is an AND gate. As is well known, enablement of an AND gate requires universal concurrence of stimuli at its input leads. Thus, for example, enablement of AND gate 36 requires the concurrence of stimuli (i.e., "1's") from the D1 terminal of timing generator 46 (FIG. 3) and the terminal $x$(FF6). Enablement of an OR gate, on the other hand, may be accomplished by supplying a stimulus to any one or both of its input leads. Thus, for example, OR gate 38 will be enabled when either or both of the AND gates 42 or 44 are enabled.

The logic and timing circuit 18 is depicted in detail in FIG. 3. As can be seen, the logic elements comprise AND and OR gates which control the operation of the switch-enabling flip-flop circuits FF1, FF2 and FF3. The timing element of circuit 18 (FIG. 1) is the timing generator 46 of FIG. 3. The timing generator 46 may be chosen from among those so well known in the art. It may, for example, be of the type disclosed at page 52, in volume 32 of Electronics (March 6, 1959), a McGraw-Hill publication.

The timing generator 46 supplies impulses at proper times to various points in the circuit of FIG. 1. The impulses appear periodically at each of the generator terminals D1 to D5. Thus, recurrent time frames, each consisting of five time slots, are generated to synchronize the various elements of the encoder. As mentioned previously, each time frame accommodates one code group. In this specification, reference will be made occasionally to "time D1," for example. This expression should be understood to mean the time of occurrence of the first time slot of a code group or, in other words, the time at which an impulse appears at the D1 terminal of generator 46.

Although the illustrative encoder of FIG. 1 generates a four-digit code, five time slots are provided. The fifth time slot is employed to reset the switch-enabling circuits FF1, FF2 and FF3 of FIG. 3. It is not necessary, however, that a fifth time slot be used. For example, it is not uncommon to provide a so-called "guard" space between each time slot. When such a space is provided, the interval between the last time slot of a time frame and the first time slot of the next following frame, may be used to serve the purpose of applicant's fifth time slot.

The delay circuit 48 provides a delay almost equal to one time slot interval. The purpose of the delay provided by delay circuit 48 is to ensure that the result of any message-reference comparison in summing amplifier 14 will not affect the operation of the reference generator until the next succeeding time slot. Thus, the delay provided by delay circuit 48 is equal to one time slot interval less the delay inherent in the logic, switching, and switch-enabling circuitry intermediate the output and input of summing amplifier 14.

Having considered the various elements of the circuit shown in FIG. 1, we will now consider the operation of the circuit. This consideration will be facilitated if a message sample of specified polarity is assumed. Let us assume at the moment, therefore, that the message sample is of positive polarity. Consequently, as mentioned previously, it will be necessary that the reference generator generate reference signals of negative polarity.

It will be assumed that no phase reversal occurs in the summing amplifier 14. This assumption is, of course, solely for the purpose of explanation. Since the message sample presently under discussion is of positive polarity, the potential at the input terminal $s$(FF6) will also be positive during time slot 1. The table for FF6 shows that when the potential of terminal $s$(FF6) is positive, the output terminals $x$(FF6) and $x'$(FF6) are respectively in the "1" and "0" states. An impulse is consequently supplied from the terminal FF6 to the input lead 50 of AND gate 36.

Since we are now in the first time slot of the code group which will represent the positive sample we have assumed, an impulse will be supplied from timing generator terminal D1 (FIG. 3) to the input 52 of AND gate 36. A concurrence of impulses at the inputs 50 and 52 enables AND gate 36. AND gate 36, in turn, supplies an impulse to terminal $s$(FF5). The table for FF5 shows that when $s$(FF5) is impulsed, terminals $x$(FF5) and $x'$(FF5) assume the "1" and "0" states, respectively. The table also reveals that the polarity switch S5 remains at rest, connected to $-E_R$ as shown. Negative reference voltage is therefore supplied to the reference conductor L5.

Reference to FIG. 3 reveals that no impulse is supplied to any of the $s$ terminals of the switch-enabling circuits FF1 to FF3 at time D1. Consequently, all the $x$ terminals of these circuits remain in the "0" state and switch-enabling stimuli are absent from the conductors L1 to L3. All the resistive branches of the reference generator of FIG. 1 are therefore disconnected from the reference conductor L5, and no reference voltage is supplied to summing amplifier 14 during time slot 1. This is in keeping with the previously-mentioned requirement that time slot 1 be reserved only for a determination of the polarity of the message sample.

This polarity determination is made by the decision circuit FF6 in conjunction with the D1 terminal of timing generator 46 of FIG. 3 and AND gate 36. We have seen that a positive message sample causes the terminal $x$(FF6) to assume the "1" state and that AND gate 36 is consequently enabled during the first time slot. An impulse is therefore supplied by AND gate 36 to the output OR gate 54. At the output terminal 16, therefore, the first digit of our hypothetical example is a "1," which is as it should be, since we assumed a message sample of positive polarity. The input 51 of OR gate 54 serves only to convey the polarity digit. The succeeding digits, the magnitude digits occupying the second, third, and fourth most significant positions of the code group, will be supplied to the input 53 of OR gate 54. These magnitude digits are supplied either by way of AND gate 88 or AND gate 90 to OR gate 92 and thence to the input 53 of OR gate 54.

A concurrence of impulses at the respective inputs of AND gates 88 and 90 is, of course, necessary if they are to be enabled. Assume, for the moment, that the positive sample we have assumed has a magnitude such that it will be represented by the code group 1111. In this case all of the resistive branches of the reference generator of FIG. 1 will ultimately be switched into the reference path. The potential of the terminal $s$(FF6) will always be greater than or equal to zero, since the message-reference comparison at summing amplifier 14 will always show the assumed message sample predominating over the reference signal. However, the final comparison (during time slot 4) ideally results in a null condition at terminal $s$(FF6). Now if terminal $s$(FF6) will be equal to or greater than zero throughout the encoding process, then the table for FF6 shows that the terminals $x$(FF6) and $x'$(FF6) will be respectively in the "1" and "0" states during that time. Also, it will be recalled that the polarity control circuit FF5 is altered, if at all, only during the first time slot. Consequently, its output terminals $x$(FF5) and $x'$(FF5) will, in our hypothetical example, be in the "1" and "0" states, respectively, throughout the code group interval. Accordingly, the inputs 94 and 96 of AND gate 88 will be enabled throughout this interval. And since the input 98 of AND gate 88 is impulsed at times D2, D3, and D4 by the timing generator 46 of FIG. 3, AND gate 88 will be enabled at each of these times. The impulses thus generated by AND gate 88 will ultimately appear at the PCM output terminal 16. To recapitulate, we saw that at time D1 a polarity digit of "1" was supplied to the output terminal 16 by way of input 51 of OR gate 54. Succeeding this polarity digit during each of the second, third, and fourth time slots was a magnitude digit of "1." Thus the cumulative code at the completion of time slot 4 was 1111. It should be noted that the inputs 100 and 102 of AND gate 90 were inactive throughout our example. Consequently, even though impulses were supplied to the input 104 of AND gate 90 at times D2, D3, and D4 by the timing generator 46 of FIG. 3, AND gate 90 was never enabled. The diodes shown connected between the timing generator 46 of FIG. 3 and the inputs 98 and 104 of AND gates 88 and 90, respectively, have been inserted to isolate the terminals D2, D3, and D4 of generator 46.

In the illustrative encoders disclosed in this specification, the code group generated to represent each message sample consists of N digits. The first, or most significant, digit indicates the polarity of the sample. If this digit is a "1" the sample is known to be of positive polarity. If it is a "0," the polarity of the sample is negative. The second, third, and fourth digits (in decreasing order of significance, as shown in the legend of FIG. 2) represent the magnitude of the sample. Suppose that a positive sample, having a magnitude equal to $$\frac{3}{7}E_R,$$

is to be encoded in the encoder of FIG. 1. This sample ultimately will be summed with a reference signal of the same magnitude but of opposite polarity, namely, $$-\frac{3}{7}E_R$$

The reference-to-code relationship (and, consequently, the message-to-code relationship) for the sample supposed is indicated by the point 65 of curve $e_3$ in FIG. 2. As can be seen, this sample will be represented by the code group 1101 (+5 code units). The first digit, a "1," indicates that the sample is of positive polarity. The second, third, and fourth digits yield a sum of $2^2+0+2^0$, or 5 code units. Now, if the sample had been of the same magnitude $$\frac{3}{7}E_R$$

but of negative polarity, its code representation would have been 0101 (−5 code units). In other words, the code magnitude 5.0 units is indicated by the same combination of digits, whether the code group represents a positive or negative message sample. But the polarity digits for positive and negative values are "primes" of one another.

A digit is the "prime" of another when it is the binary opposite of the other. For example, if a digit is a "1" (used here to indicate positive message sample polarity) then its prime is the digit "0" (used here to indicate negative message sample polarity). By the same token, when an entire code group is "primed," each element of the group becomes its binary opposite. Thus, for example, the "prime" of the code group 1101 is 0010.

The digital information fed into the delay circuit 48 is the "prime" of the code presented to the output terminal 16. This will be understood from a consideration of the operations which take place in the AND gates 42 and 44 and the OR gate 38 during the first time slot of the hypothetical example we have assumed. During the first time slot, the terminals $x$(FF6) and $x'$(FF6) where in the "1" and "0" states, respectively. The terminals $x$(FF5) and $x'$(FF5) were also respectively in these states. Consequently, there was no concurrence of impulses at either of the AND gates 42 or 44. OR gate 38 was, therefore, not enabled and no impulse was supplied to the delay circuit 48. On the other hand, as we have seen, an impulse was supplied to the PCM output terminal 16 during time slot 1. In binary terms, a "0" was supplied to delay circuit 48 while a "1" was supplied to the output terminal 16. Accordingly, the digital information supplied to delay circuit 48 is the "prime" of that supplied to the output terminal 16.

At the commencement of time slot 2, i.e., at time D2, the "0" digit which was presented to delay circuit 48 during time slot 1 will be supplied to the logic and timing circuit 18. None of the various circuits connected to the conductor L4 will be affected by the "0" digit from delay circuit 48.

As we have already noted, the encoder of FIG. 1 will begin generating the magnitude digits during time slot 2. We will trace the negative reference voltage $-E_R$ as it progresses through the polarity switch S5, the reference conductor L5 and one of the reference branch sets, namely, the set comprising the resistors $R_1$, $R_1'$ and $R_1''$. The process through the other reference branch sets is similar. We will note that the transformation of the reference-to-code relationship as energy from the reference source $-E_R$ is conveyed successively through S1 and $R_1$, S1' and $R_1'$, and S1'' and $R_1''$.

FIG. 2 will be helpful in describing this transformation. The output code $x$ is shown on the abscissa of FIG. 2. Reference voltage is indicated on the ordinate. The linear plot farthest to the left reveals the relationship between the output voltage $e_1$ of reference network I and the output code $x$. The curve at the extreme right represents the relationship between the output voltage $e_3$ of reference network III, and the output code. The plot for $e_3$ is also representative of the message-to-code relationship, as we have already seen. The curve lying between the curves for $e_1$ and $e_3$ indicates the relationship between the output voltage of $e_2$ of reference network II and the code.

As we have seen, reference voltage will be supplied to the various resistive branches of the reference generator only when their associated switching networks are enabled by the logic and timing circuit 18. The circuit 18 is shown in FIG. 3. Since we are presently in time slot 2, an impulse is supplied from the terminal D2 of timing generator 46 to the terminal $s$(FF1). The switch-enabling circuits FF2 and FF3 remain inert at this time. The impulse supplied to $s$(FF1) causes the output terminal $x$(FF1) to assume the "1" state. Terminal $x$(FF1) in turn energizes the conductor L1. Since they are now energized, the switch-enabling leads 22, 26 and 28 cause their associated switches S1, S1' and S1'' to switch from their ground to their reference terminals. The resistors $R_1$, $R_1'$ and $R_1''$ are now connected between summing amplifier 14 and the reference source $-E_R$.

It should be noted that the terminal $r$(FF1) can only be impulsed during time slot 3. But terminal $r$(FF1) will not be impulsed at that time if, during time slot 2, the message-reference comparison at summing amplifier 14 (FIG. 1) indicates that the message sample amplitude is greater than the reference signal amplitude. In this event, the second most significant digit appearing at the PCM output terminal 16 will be a "1". At the same time (time D2), the prime of this digit, i.e., a "0" will be supplied to the delay circuit 48. Approximately one time slot later (time D3) this "0" digit will be supplied to the conductor L4. Consequently, there will not be a concurrence of impulses at AND gate 72, OR gate 74 will not be enabled, and no impulse will be supplied to terminal $r$(FF1).

So, also, if the state of conductor L4 is "0" at time D4, neither AND gate 76 nor OR gate 78 will be enabled and, consequently, terminal $r$(FF2) will not be impulsed.

At time D5, however, the terminals $r$(FF1), $r$(FF2), and $r$(FF3) will all be impulsed by the timing generator terminal D5, regardless of the outcome of the message-reference comparison occurring in time slot 4. The terminals $x$(FF1), $x$(FF2), and $x$(FF3) will consequently all be in the "0" state and no stimuli will be present on their associated reference conductors L1 to L3. The reference generator of FIG. 1 will therefore be inert throughout the first time slot of the next succeeding frame.

The reference energy conveyed from the source $-E_R$ through the switch S1 and the resistor $R_1$ appears at the input of amplifier 58 as the voltage $e_1$. The relationship between the reference voltage and the output code at this juncture in the reference path, extending from the source $-E_R$ to the summing amplifier 14, is represented by the point 60 on the curve for $e_1$ in FIG. 2. The amplifiers 58 and 62 are inserted for impedance transformation purposes. Each of them has a high input impedance so as not to "load down" the immediately preceding reference network, and a low output impedance, in order to serve as a constant voltage source for the next following network.

The reference energy enters the reference network II at the reference terminal 30 of switch S1', passes through the resistor $R_1'$ and appears at the input of amplifier 62 as the voltage $e_2$. The relationship between the reference voltage and the output code at this juncture in the reference path is given by the point 64 on the curve for $e_2$ in FIG. 2. The reference-to-code relationship at the input of amplifier 62 is therefore defined by a second order parabola.

The reference energy progresses finally through the resistive branch comprising resistor $R_1''$, and appears at the output of reference network III as the voltage $e_3$. The reference-to-code relationship at this juncture of the reference path is given by the point 66 of the curve for $e_3$ in FIG. 2. This relationship, as can be seen, is parabolic to the third degree.

The reference voltage $e_3$ is now fed via the summing resistor 34 into the reference input of summing amplifier 14 where it is compared with the message sample. If the reference voltage $e_3$ is of smaller magnitude than is the message sample, a "1" will be generated at the PCM output terminal 16 and the reference branch set comprising the resistors $R_1$, $R_1'$, and $R_1''$ will remain connected in the reference signal path. If, however, the magnitude of the message sample is greater than that of the reference voltage, a "0" will be generated at the PCM output terminal 16, a "1" will be supplied to delay circuit 48, and the reference branch set comprising the resistors $R_1$, $R_1'$, and $R_1''$ will be disconnected from the reference conductor L5 at the start of the next time slot (i.e., at time D3).

In any event, the switch-enabling conductor L2 will be energized during time slot 3 by terminal $x$(FF2) of FIG. 3. This will occur as a consequence of an impulse supplied from the terminal D3 of timing generator 46 to the terminal $s$(FF2). Energization of the switch-enabling lead L2 will result in the connection of the reference branch set comprising the resistors $R_2$, $R_2'$ and $R_2''$ to the reference conductor L5. If the subsequent comparison in summing amplifier 14 reveals that the message sample is still greater in absolute magnitude than the reference voltage, another "1" will be generated at the PCM output terminal 16; and, as a consequence, the reference branch set comprising the resistors $R_2$, $R_2'$ and $R_2''$ will remain connected in the reference path. But if the message-reference comparison indicates that the absolute magnitude of the reference voltage is greater than that of the message sample, a "0" will be generated at the PCM output terminal 16 and the last-mentioned reference branch set will be disconnected from the reference conductor L5. In any event, the switch-enabling conductor L3 will be energized during time slot 4 by the terminal $x$(FF3); for, at time D4, the terminal $s$(FF3) is impulsed by the timing generator 46 and the terminal $x$(FF3) assumes the "1" state.

Note that the encoding characteristic for the encoder of FIG. 1 is symmetrical; and, consequently, that the characteristic extends into the third quadrant, which is only partially shown. The bipolar nature of the encoder is due to the availability of both positive and negative reference optential at the polarity switch S5.

Note, also, the voltage-dividing process effected by the reference network switches. At time D1, for example, the resistor $R_1$ is connected to $E_R$ while resistors $R_2$ and $R_3$ are connected to ground. At the common junction point 45 of $R_1$ and the parallel combination of $R_2$ and $R_3$, the voltage $e_1$ is taken and supplied to amplifier 58. Since the resistors $R_1$ and $R_2$—$R_3$ form a voltage divider and since, as we have seen, $R_1:R_2:R_3=1:2:4$, the output voltage $e_1$ of reference network I is $$\frac{4}{7} E_R$$

Reference networks II and III each provide the same voltage-dividing process encountered in reference network I. Assuming no amplification in amplifiers 58 and 62, we find that the output voltage $e_2$ and $e_3$ of reference networks II and III are therefore $$\frac{16}{49} E_R \left(\text{i.e., } \frac{4}{7} e_1\right) \text{ and } \frac{64}{343} E_R \left(\text{i.e., } \frac{4}{7} e_2\right)$$

respectively. The voltages $e_1$, $e_2$ and $e_3$ extant during the first time slot of a code group, are indicated in FIG. 2 at the points 60, 64, and 66, respectively.

It should be noted that the addition of further like networks to the reference generator of FIG. 1 will increase the parabolic order of the encoding characteristic. Thus, for example, if a reference network IV were added in cascade to reference network III and properly connected to summing amplifier 14 and the switch-enabling conductors L1, L2 and L3, the encoding characteristic of the encoder would become parabolic to the fourth degree. The output voltage $e_4$ of such an additionally cascaded reference network would be given by the expression $$e_4=\frac{x^4.E_R}{(2^{N-1}-1)^4}$$

where $x$ is the output code value and N is the number of digits in the code, including the polarity digit. In general, $$e_n=\frac{x^n.E_R}{(2^{N-1}-1)^n}$$

where $n$ equals the number of cascaded reference networks and N equals the number of digits in the code.

Figure 4:
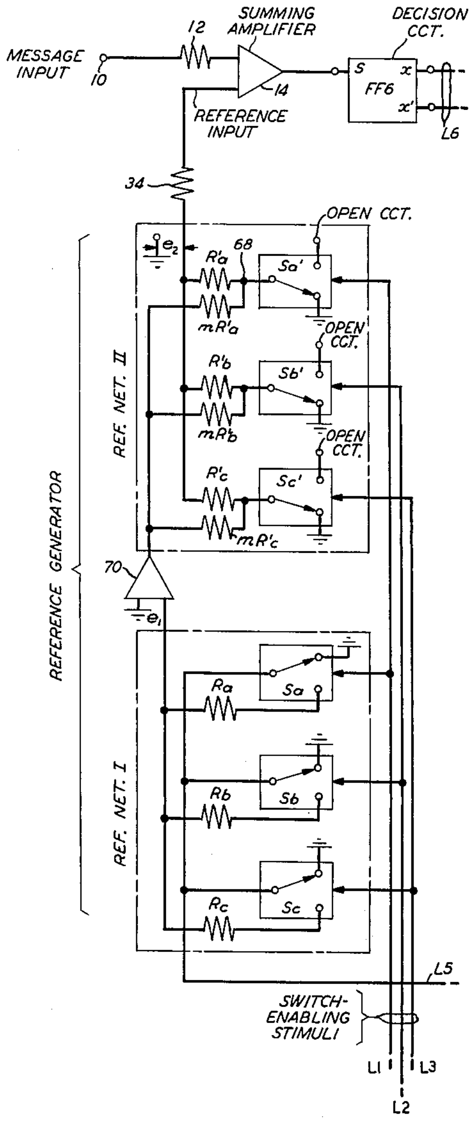
FIG. 4 shows a reference generator of an illustrative "Type B" which may be used in lieu of the reference generator of FIG. 1.

If the reference generator of FIG. 4 is substituted for the reference generator of FIG. 1, the encoder of FIG. 1 will have a message-to-code relationship defined by the equation:

$$y=\frac{x^2}{(m+1)-mx}$$

where $y$ is the message sample value, $x$ is the code representation of this sample value, and $m$ is a parameter which modifies the impedance of reference network II and thereby influences the curvature of the encoding characteristic. The parameter $m$ defines a whole family of curves and its value may be chosen according to the message-to-code relationship desired.

The encoding characteristic produced by the reference generator of FIG. 4 may conveniently be called a "Type B" characteristic. The "Type B" characteristic may be produced by a reference generator as shown in FIG. 4 or by a generator in which the reference network II precedes the reference network I in the reference signal path from the conductor L5 to the summing amplifier 14. In other words, this characteristic may be produced by an encoder in which the output voltage of the first reference network in the reference signal path varies linearly with its input voltage and the output voltage of the second reference network in the reference signal path varies hyperbolically with its input voltage; or by an encoder in which the output voltage of the first reference network varies hyperbolically with its input voltage and the output voltage of the second reference network varies linearly with its input voltage.

The encoding process employed when using the reference generator of FIG. 4 is identical to that employed when using the reference generator of FIG. 1. Thus, for example, after the polarity determination has been made in the first time slot, and the encoder is prepared to translate the magnitude of the message sample into binary code, the switch-enabling conductor L1 will be energized and the switches S*a* and S*a*′ will be enabled. Switch S*a* will connect the reference conductor L5 to the resistor $R_a$ and switch S*a*′ will connect the junction point 68 of resistors $R_a'$ and $mR_a'$ to open circuit, thus permitting the flow of reference current into summing amplifier 14.

The amplifier 70 is of the same type as amplifiers 58 and 62 of FIG. 1. Amplifier 70 therefore has a high input impedance and a low output impedance. The switch-enabling conductors L1, L2, and L3 are connected to the corresponding switch-enabling circuits of the logic and timing circuit 18 of FIG. 1 (shown in detail in FIG. 3). The conductor-pair L6 is identical to that of FIG. 1.

In each reference network of FIG. 4, the ohmic values of corresponding resistive branches are related as the powers of two. Thus, $$R_a:R_b:R_c=R_a':R_b':R_c'=1:2:4$$

Of course, the resistors $mR_a'$, $mR_b'$, and $mR_c'$ bear this relationship also.

Figure 5:
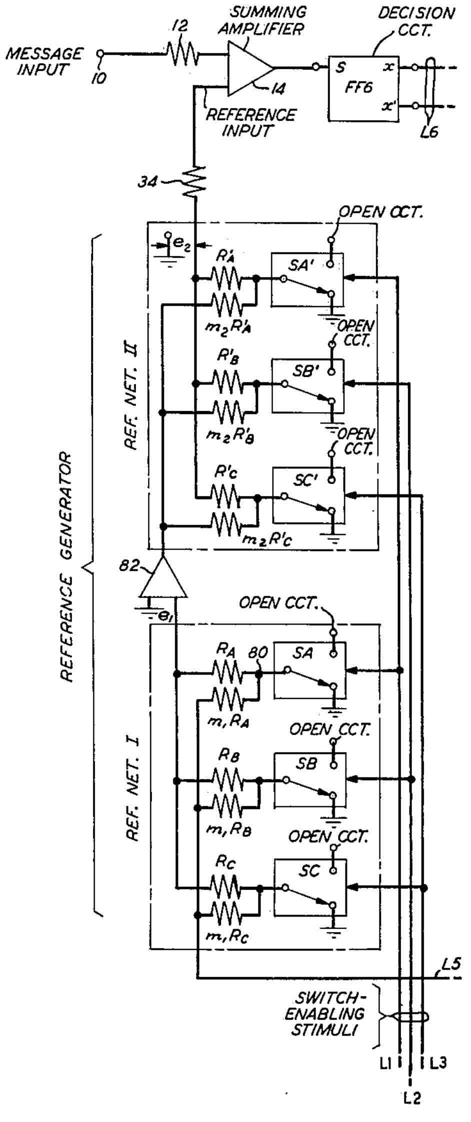
FIG. 5 shows a reference generator of an illustrative "Type C" which also may be used in lieu of the reference generator of FIG. 1.

The reference generator of FIG. 5 may also be used in lieu of that of FIG. 1. Again the encoding process is the same. Switches in the reference branch sets, e.g., the switches SA and SA′, are switched in unison. When enabled, each switch (e.g., SA) connects the junction point (e.g., junction point 80) of its associated resistor-pair (e.g., $R_A$, $mR_A$) to open circuit. The output voltage $e_1$ of reference network I varies hyperbolically with its input voltage $E_R$, which is supplied via reference conductor L5. This hyperbolically-varying voltage is, in turn, fed to the second reference network of the cascaded chain, reference network II.

The relationship between the voltage that emerges from reference network II, the voltage $e_2$, and the output code is given by the equation $$e_2=\left[\frac{x}{(m+1)-x}\right]^2$$

where $x$ and $m$ are as given before, with the exception that the parameter $m$ here modifies the impedance of both reference networks I and II. This relationship assumes a cascade of only two hyperbolically-varying reference networks (as shown in FIG. 5) and, also, that the parameter $m$ is the same in reference network I of FIG. 5 as it is in reference network II; that is to say, the relationship assumes that $m_1=m_2$. This equality is not necessary, however, and the more general equation is $$e_n=\frac{x^n}{\prod_{i=1}^{n}[(m_i+1)-m_ix]}$$

where the $m_i$ ($m$=1, 2, . . . $n$) are parameters modifying the impedance of their respective reference networks; and $n$ is the number of simultaneously-switched, hyperbolically-varying, reference networks through which the reference voltage $E_R$ of FIG. 1 finds its way ultimately to the summing amplifier 14. The number of networks is chosen in accordance with the statistical amplitude distribution of message signals which the encoder will be expected to encode. This number ($n$) has, of course, a practical limit.

As mentioned previously in connection with FIG. 1, it is necessary that no reference current be fed into summing amplifier 14 during time slot 1. This time slot is reserved solely for a determination of the message sample's polarity. Reservation of the first time slot is ensured in FIG. 5, as can be seen, by having all switches normally connected to ground. When activated, they will be switched to open circuit. Thus, for example, at the commencement of time slot 2 an undiverted serial path will connect the reference conductor L5 to summing amplifier 14. The path will comprise the resistors $m_1R_A$, $R_A$, amplifier 82, and the resistors $m_2R_A'$ and $R_A'$.

The message-to-code relationship obtainable with the embodiment of FIG. 5 is ideal for encoding signals having a constant R.M.S. value and a negative exponential amplitude distribution. One important species of signal having such a distribution is the voice signal. This distribution is also called the probability tensity $p(y)$ of the signal. The probability density $p(y)$ of voice signals encountered in telephony is given by the following expression:

$$p(y)=\frac{1}{A\sqrt{2}}\exp\left(-\sqrt{2}\,\frac{y}{A}\right)$$

where A is the R.M.S. value of the signal. Voice signals, if not of constant R.M.S. value initially, may be made so before application to the input terminal 10 of FIG. 5, if the gain of each particular line is properly adjusted. Whether or not this adjustment is made, the embodiment of FIG. 5 provides substantial improvement in signals having the negative exponential distribution spoken of above. This improvement is due to the fact that the message-to-code relationship provided by the encoder shows preference to the lower magnitudes of such distributions and, further, that these magnitudes predominate in signals having such distributions. For a more comprehensive discussion of the statistics of signals the reader may wish to refer, for example, to chapter 34 ("Probability and Statistics") of Reference Data for Radio Engineers (4th ed. 1956).

As we have seen in connection with FIGS. 1 and 4, corresponding resistive branches within each reference network of FIG. 5 are related as the powers of two. Thus, for example, $$R_A:R_B:R_C=R_A':R_B':R_C'=1:2:4$$

The parameters $m_1$ (reference network I) and $m_2$ (refference network II) do not, of course, affect this interrelationship. Thus, for example, the resistors $m_1R_A$, $m_1R_B$, and $m_1R_C$ are also related in ohmic value as the powers of two.

It should be noted that a PCM receiver would have to be arranged to perform, in reverse, the process performed by the illustrative encoders disclosed here. The receiver's decoder would use the same networks that are used in the encoder. The decision circuit FF6 would be unnecessary, since the polarity digit which the receiver first receives would determine the polarity of the reconstructed sample. The succeeding magnitude digits would control switch-enabling circuits of the type shown in FIG. 3. These circuits would, in turn, control the amount of current necessary to produce a replica of the original message sample.

The above-described arrangements have been chosen to illustrate the principles of the invention. In accordance with these principles other arrangements may be derived without departing from its spirit and scope.

What is claimed is:

1. An encoder for nonlinearly transforming amplitude samples of message current to a permutation code which consists of groups of recurring elements, comprising means for supplying said message current to said encoder; means for sequentially generating reference currents; means for sequentially comparing said reference currents with said message current; means responsive to said sequential comparison means for generating said permutation code as an output of said encoder; and means synchronized with the elemental positions of said code for timing said sequential operations; said reference current generating means including switch means, responsive to said sequential comparison means, for controlling the quantum of reference current generated by said reference current generating means, and further including a plurality of cascaded impedance netwoks, each of said networks comprising a plurality of impedance branches, each of which is associated with a corresponding branch in each of the other impedance networks; said switching means varying the impedance of corresponding branches in unison to vary the output voltages of said networks simultaneously in accordance with a prescript mathematical relationship with said code; the number of said networks and the manner in which the output voltage of each varies with said code being dependent upon, and chosen in accordance with the statistical amplitude distribution of said message current to optimize the signal-to-quantizing noise ratio of the encoder.

2. An encoder in accordance with claim 1 in which the output voltage of each of said cascaded impedance networks is varied parabolically with said output code by said switching means, and in which the relationship between said message current and said output code is $$y=x^n$$

where $y$ signifies the amplitude of said message current, $x$ is the code value representation of the amplitude $y$, and $n$ is the number of said cascaded impedance networks.

3. An encoder in accordance with claim 1 in which the output voltage of at least one of said cascaded impedance networks is varied hyperbolically with said output code by said switching means.

4. An encoder in accordance with claim 1 in which said plurality of impedance networks comprises one whose output voltage varies linearly with said output code and another, next succeeding said one, whose output voltage varies hyperbolically with said output code.

5. An encoder for nonlinearly transforming amplitude samples of message current to a permutation code which consists of groups of recurring elements, comprising means for supplying said message current to said encoder; means for sequentially generating reference currents; means for sequentially comparing said reference currents with said message current; means responsive to said sequential comparison means for generating said permutation code as an output of said encoder; and means synchronized with the elemental positions of said code for timing said sequential operations; said reference current generating means including switching means, responsive to said sequential comparison means, for controlling the quantum of reference current generated by said reference current generating means, and further including a pair of cascaded impedance networks, the output voltage of the first of which is varied linearly with said code by said switching means and the output voltage $e_2$ of the second of which bears the following relationship with said output code:

$$e_2=\frac{x^2}{(m+1)-mx}$$

where $x$ represents the value of said code, and $m$ is a parameter modifying the impedance of said second impedance network.

6. An encoder in accordance with claim 5 in which an impedance-transforming amplifier interconnects the output of said first impedance network with the input of said second impedance network; said amplifier having a high input impedance, which it presents to the output of said first network, and a low output impedance, which it presents to said second network.

7. An encoder for nonlinearly transforming amplitude samples of message current to a permutation code which consists of groups of recurring elements, comprising means for supplying said message current to said encoder; means for sequentially generating reference currents; means for sequentially comparing said reference currents with said message current; means responsive to said sequential comparison means for generating said permutation code as an output of said encoder; and means synchronized with the elemental positions of said code for timing said sequential operations; said reference current generating means including switching means, responsive to said sequential comparison means, for controlling the quantum of reference current generated by said reference current generating means, and futher including a plurality of cascaded impedance networks, the ouput voltage of each of which is varied by said switching means simultaneously with the other output voltages in accordance with a prescript mathematical relationship with said code, the output voltage $e_n$ of the last said impedance networks bearing the following relationship with said output code:

$$e_n=\frac{x^n}{\prod_{i=1}^{n}[(m_i+1)-m_ix]}$$

where $n$ represents the number of said impedance networks in cascade, $x$ represents the value of said code, and the $m_i$ are parameters modifying the impedance of their respective impedance networks.

References Cited in the file of this patent

UNITED STATES PATENTS

| | | |
|---|---|---|
| 2,592,308 | Meacham | Apr. 8, 1952 |
| 2,833,855 | Pages | May 6, 1958 |